(12) United States Patent
Clauss et al.

(10) Patent No.: US 9,086,300 B2
(45) Date of Patent: Jul. 21, 2015

(54) ELECTRIC MOTOR AND METHOD FOR THE OPERATION OF AN ELECTRIC MOTOR

(75) Inventors: Christin Clauss, Ostfildern (DE); Stefan Scheller, Stuttgart (DE); Hans-Jorg Hemminger, Esslingen (DE); Michael Apel, Esslingen (DE)

(73) Assignee: FESTO AG & CO. KG, Esslingen (DE)

( * ) Notice: Subject to any disclaimer, the term of this patent is extended or adjusted under 35 U.S.C. 154(b) by 681 days.

(21) Appl. No.: 13/409,662

(22) Filed: Mar. 1, 2012

(65) Prior Publication Data

US 2012/0242263 A1  Sep. 27, 2012

(30) Foreign Application Priority Data

Mar. 23, 2011  (DE) .......................... 10 2011 014 881

(51) Int. Cl.
| | |
|---|---|
| H02P 6/16 | (2006.01) |
| H02P 6/00 | (2006.01) |
| G01D 5/14 | (2006.01) |
| G01D 5/244 | (2006.01) |

(52) U.S. Cl.
CPC ............... *G01D 5/145* (2013.01); *G01D 5/244* (2013.01); *G01D 5/24447* (2013.01)

(58) Field of Classification Search
CPC .............. H02P 6/06; H02P 6/16; H02P 6/182
USPC ....................................... 318/400.01, 400.04
See application file for complete search history.

(56) References Cited

U.S. PATENT DOCUMENTS

| | | | | |
|---|---|---|---|---|
| 6,424,105 | B1* | 7/2002 | Breit et al. | 318/400.08 |
| 7,004,107 | B1* | 2/2006 | Raoux et al. | 118/723 E |
| 7,050,929 | B2 | 5/2006 | Norell | |
| 2010/0156402 | A1* | 6/2010 | Straubinger et al. | 324/207.25 |
| 2012/0060603 | A1* | 3/2012 | Bork | 73/460 |

FOREIGN PATENT DOCUMENTS

| | | |
|---|---|---|
| DE | 4229610 | 6/1993 |
| DE | 10111399 | 5/2002 |
| EP | 0995974 | 4/2000 |
| EP | 1471331 | 10/2004 |
| EP | 2237408 | 10/2010 |
| FR | 2703450 | 10/1994 |

* cited by examiner

*Primary Examiner* — Eduardo Colon Santana
*Assistant Examiner* — Gabriel Agared
(74) *Attorney, Agent, or Firm* — Hoffmann & Baron, LLP

(57) ABSTRACT

An electric motor having a rotor and a stator as well as a measuring device designed for detecting a position of the rotor, which is movable relative to the stator, and comprising a sensor system for the provision of sensor signals in dependence on the position of the rotor relative to the stator and a processing device for controlling the sensor system, for processing the sensor signals and for outputting a position signal. The processing device is configured for switching between a first operating state with a continuous or high-frequency intermittent provision of supply energy to the sensor system and a second operating state with a low-frequency intermittent provision of supply energy to the sensor system.

11 Claims, 1 Drawing Sheet

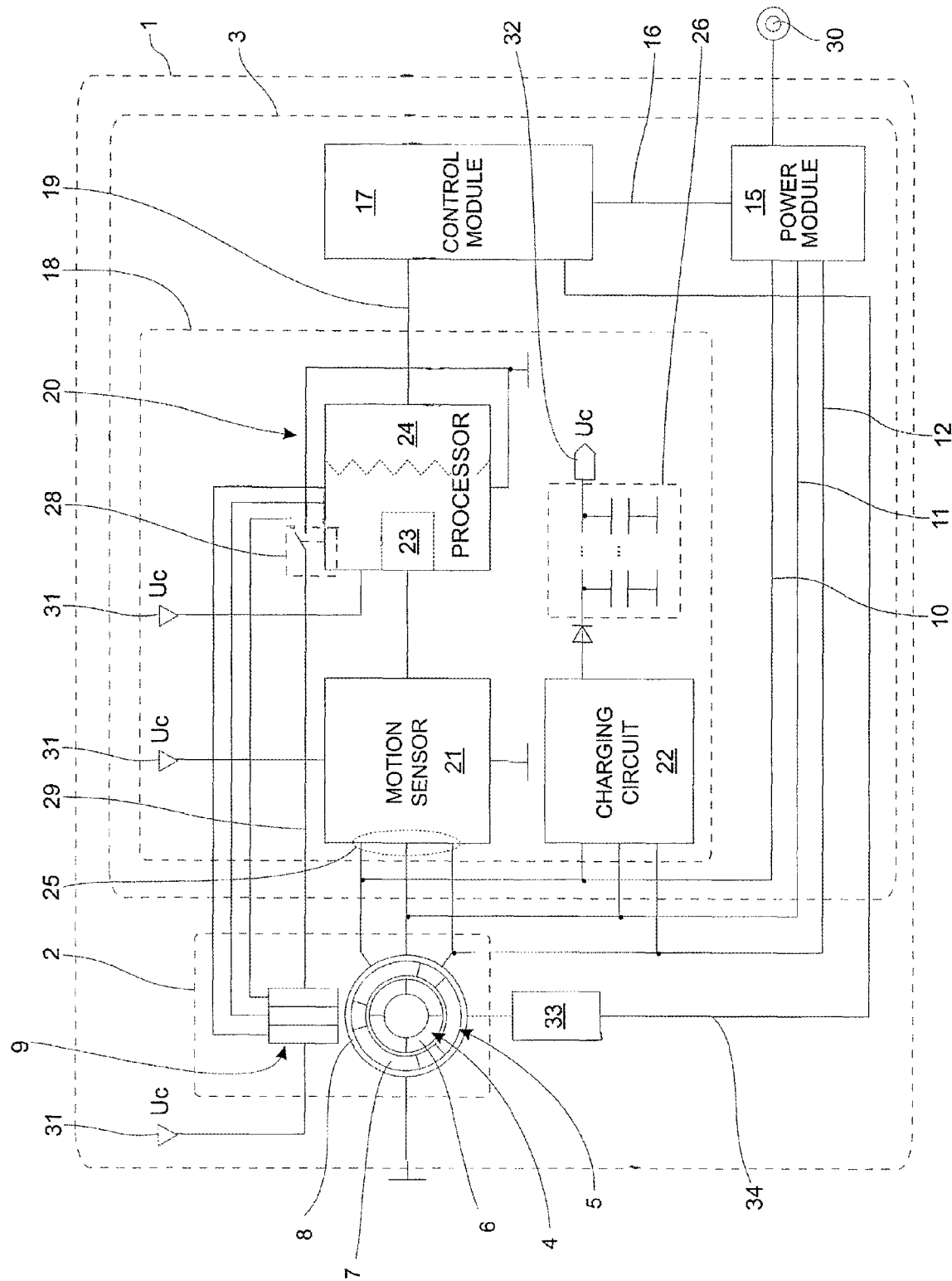

ELECTRIC MOTOR AND METHOD FOR THE OPERATION OF AN ELECTRIC MOTOR

BACKGROUND OF THE INVENTION

The invention relates to an electric motor having a rotor and a stator as well as a measuring device designed for detecting a position of the rotor, which is movable relative to the stator, and comprising a sensor system for the provision of sensor signals in dependence on the position of the rotor relative to the stator and a processing device for controlling the sensor system, for processing the sensor signals and for outputting a position signal. The invention further relates to a method for the operation of an electric motor.

From EP 1 471 331 A2, a method for the detection of the position of a moving element by means of a sensor is known, which method involves a magnetisation at the element. If the operating voltage is switched on, the position is detected by a magnet-sensitive sensor as a counting result of an alternating north pole/south pole magnetisation; if the operating voltage is switched off, the sensor is supplied with energy from an energy accumulator, and the counted poles are stored in a memory device.

EP 0 995 974 A1 discloses a rotary encoder with an encoder shaft supporting a first code disc for single-turn measurement and a second code disc for multi-turn measurement. The rotary encoder comprises a logic module containing signals of evaluation electronics assigned to the multi-turn code disc. This logic module is only supplied with current/voltage at a level change of the signals of a sensor or at a timing pulse.

Such methods are, among other purposes, used to determine the position of a rotor relative to a stator of an electric motor, such as an electronically commutated electric motor, in order to supply the coils of the electric motor with power as efficiently as possible. In a permanent supply of an electric motor with electric energy, the position of the rotor relative to the stator is determined at the time of start-up and then pursued further by means of an incremental position sensor. An (emergency) stop of such an electric motor, however, involves a need for a renewed determination of position. In order to avoid this initialisation of the electric motor after each stop, known methods and devices rely on position detection based on an internal energy accumulator, such as a battery, if the external voltage supply, for example a mains voltage for the motor, fails.

SUMMARY OF THE INVENTION

The invention is based on the problem of providing an electric motor and a method for the operation of an electric motor, wherein the position of the rotor relative to the stator can be determined unambiguously and as simply and cheaply as possible even if there is no external voltage supply.

For an electric drive device, this problem is solved according to a first aspect of the invention with the features of claim 1. For this purpose, it is provided that the processing device is configured for switching between a first operating state with a continuous or high-frequency intermittent provision of supply energy to the sensor system and a second operating state a with low-frequency intermittent provision of supply energy to the sensor system.

In the first operating state, the entire electric drive device is supplied with electric energy, for example by means of an external supply voltage, in particular a mains voltage. As a result, the drive device can make available a mechanical power, for example in the form of a linear movement or a rotary movement of the rotor with respect to the stator, and for example transmit this power to a machine component. In this operating state, the energy demand of the electric coil in the rotor and/or in the stator of the electric drive device, which is/are selectively supplied with electric energy to generate the desired movement, is considerably higher than the energy demand of the measuring device used to determine the position of the rotor relative to the stator. As a result, the measuring device has sufficient energy available for ensuring either a continuous or a high-frequency intermittent supply energy for the sensor system. In the second operating state, on the other hand, there is no provision for a power output of the electric drive device; such an operating state may, on the contrary, prevail after a planned or emergency stop of the electric drive device. In this second operating state, the external energy supply is interrupted completely. Owing to external influences, such as inertial effects of mechanical components which are mechanically and operatively connected to the electric drive device, or owing to the action of forces on such components, relative movements are possible between the rotor and the stator even after the external supply voltage has been switched off. If these relative movements cannot be monitored or detected, an initialisation of the position of the rotor relative to the stator has to be performed when the electric motor is restarted. There is therefore a desire for the reliable and simple comprehension of these relative movements even if the supply voltage has failed. The purpose is to ensure that the electric drive device can be restarted as fast as possible and preferably without any delay as soon as the external supply voltage is once again available. This, however, requires the exact position of the rotor relative to the stator to be known. In order to provide for this as simply and cheaply as possible, it is advantageous to use the sensor system, which is in any case provided for the active operation of the electric drive device, for passive movements which are externally impressed on the electric drive device in the second operating state as well. In order to minimise the energy consumption for position detection in the second operating state and to ensure a long monitoring time even with a small energy accumulator, it is advantageous if the position of the rotor relative to the stator is scanned with a lower frequency than in the first operating state. Unlike in the first operating state, there is no permanent or high-frequency energy supply of the sensor system, but rather a low-frequency energy supply. A small energy accumulator is therefore sufficient for a long monitoring time for the electric drive device.

Advantageous further developments of the invention are specified in the dependent claims.

It is expedient if a capacitor arrangement designed for the provision of the supply energy to the processing device while the supply voltage for the electric motor is disconnected is assigned to the processing device. In the first operating state of the electric drive device, the capacitor device can be charged with electric energy in a simple way. In contrast to the buffer batteries or buffer accumulators known from prior art, which have a limited service life and, in the case of buffer accumulators, require an electric circuit for protection against overcharging and undercharging, the circuit requirements for the energy accumulator according to the invention are minimal. In addition, the capacitor arrangement can be disposed of together with the rest of the measuring device. In contrast, conventional buffer batteries or buffer accumulators have to be disposed of separately owing to the heavy metals they contain.

It is advantageous if the capacitor arrangement is electrically coupled to a coil winding of the stator and/or the rotor in such a way that in the second operating state, in which the electric motor is disconnected from the voltage supply, an electric voltage induced in the rotor and/or the stator, in particular an intermediate circuit voltage, can be made available as charging voltage for the capacitor arrangement. This supports the desirable size reduction of the energy storage device, which is preferably designed as a capacitor arrangement. If the rotor moves relative to the stator, the voltage induced in the motor in the generator mode can be used directly to charge the capacitor arrangement, thereby operating the measuring device in the second operating state.

In a further development of the invention, it is provided that the processing device comprises several functional regions of which at least one can be switched between an activation state and a deactivation state, a first functional region being designed for the activation and deactivation of a second functional region. The functional regions of the processing device may for example be designed as discrete components, for example in the form of different integrated circuits, or as circuit blocks of a common integrated circuit, which can be supplied with electric energy individually. The functional regions are preferably formed together on a semiconductor component of a microprocessor or microcontroller. In this context, it may be provided that the second and any further disconnectable functional regions are switched between the activation state and the deactivation state by signals of the first functional region based on external input signals. At least one of the functional regions, for example a computing unit for the unambiguous calculation of the position signal using the signals of the sensor system, is designed to be disconnectable, so that a minimum of energy is consumed in the second operating state. It is particularly advantageous if the first functional region is designed such that, if it receives sensor signals, it outputs a control signal to the second functional region, which is designed for the determination and possibly the storage of the position signal, in order to determine the position signal. If there are no further signals from the sensor system, an energy supply of the further functional region is interrupted by the first functional region in order to save electric energy.

A motion sensor designed for providing a signal if the rotor moves relative to the stator while the voltage supply for the electric motor is disconnected is preferably assigned to the processing device, in particular to the first functional region of the processing device, wherein the first functional region is designed for an evaluation of the signals of the motion sensor and/or for outputting a motion signal provided that the signal of the motion sensor exceeds a presettable threshold value. The motion sensor is used for the detection of relative movements between the rotor and the stator. It is in particular used for the detection of movements which are so fast that they would make sensor signals to be detected at each next point in time ambiguous between two measuring cycles of the sensor device which are performed in accordance with the low-frequency intermittent provision of supply energy for the sensor system. This ambiguity occurs if the sensor system is made up from sensors each of which can cover only a limited movement range, for example in a rotor of a DC motor only a fraction of a full rotor revolution. During the first operating state, such a limited detection range of each sensor does not pose any problems, because the rotor position is detected by the sensor system continuously or with a high frequency, so that the relative position between the rotor and the stator is always known. In contrast, in a low-frequency, intermittent provision of supply energy for the sensor system, detection by means of the motion sensor is expedient if gaps in position detection, which would otherwise occur, are to be avoided. The detection of movement can lead to an advance of the next measuring cycle, i.e. to a short-term, in particular single, increase of measuring frequency, so that, without any further relative movements between the rotor and the stator, subsequent measurements can be continued at the original measuring frequency. Alternatively, the motion signal can trigger an additional position detection which is inserted between two measuring cycles.

On this basis, it is provided in an advantageous further development of the invention that the processing device is designed for a provision of supply energy to the sensor system if the motion signal is present.

It is expedient if the motion sensor is designed as a current and/or voltage sensor for a detection of an electric potential in a coil winding of the stator and/or of the rotor, in order to detect, at a relative movement between the stator and the rotor, an electric voltage induced in the rotor and/or in the stator and to output the motion signal if the induced voltage exceeds a presettable threshold value. The detected current or the detected potential is preferably assessed in the first functional region of the processing device, which can then, if required, in particular if the signal of the motion sensor exceeds the presettable threshold value, output a motion signal to further functional regions, in order to provide supply energy for the sensor system, to evaluate the signals of the sensor system and to store the detected position signal.

It is advantageous if the measuring device comprises a measuring transducer which is designed to scan a position of the rotor and is in particular coupled to the rotor and which is provided for making available a position signal in the first operating state. With the aid of this measuring transducer, which is in particular an incrementally operating or single-turn absolute sensor for rotational or translational movements, an additional position detection can be performed for the rotor in the first operating state, which is then balanced with the position detection by the sensor system and may allow for a higher positioning accuracy.

According to a second aspect of the invention, the problem on which the invention is based is solved by the features of claim 9. In this claim, it is provided that a monitoring process of an electric motor comprising a stator and a rotor movable relative thereto as well as a measuring device which is designed for the determination of a position of the rotor mounted for relative movement with respect to the stator and which comprises a sensor system for the provision of sensor signals in dependence on the position of the rotor relative to the stator and which further comprises a processing device for controlling the sensor system, for processing the sensor signals and for outputting a position signal comprises the following steps: a continuous or high-frequency intermittent provision of supply energy for the sensor system by the processing device in a first operating state and a low-frequency intermittent provision of supply energy for the sensor system in a second operating state and the evaluation of the sensor signal by the processing device and the outputting and/or storage of a position signal describing the position of the rotor relative to the stator. In the second operating state, the sensor system is only supplied with electric energy intermittently in order to save energy. In this way, the energy consumption of the measuring device and thus the loading of the energy accumulator assigned to the measuring device are kept low.

In a further development of the method, it is provided that, during a disconnection of a voltage supply for the electric motor, the supply energy for the processing device is provided by a capacitor arrangement. The capacitor arrangement makes available the stored electric energy without any complex electric circuitry and can advantageously be charged in the first operating state by means of the electric energy which is provided for the movement of the rotor relative to the stator.

In addition, during the second operating state, in which the electric motor is disconnected from an external supply, the capacitor arrangement can be charged by means of a voltage induced in the rotor and/or in the stator, an electric coupling being preferably provided between the capacitor arrangement and a coil winding of the stator and/or of the rotor. In this way, the electric drive device is used as a generator for energy recovery if the construction of the electric drive device permits.

It is expedient if the processing device comprises several functional regions and if, in the second operating state, a first functional region takes over the low-frequency intermittent provision of supply energy for the sensor system and/or the switching of at least one further functional region between a deactivation state and an activation state for the evaluation of the sensor signal and/or for the storage of the position signal. By disconnecting one or more functional region(s) responsible in the first operating state for the calculation of the position signal and/or for further signal processing, a significant amount of energy can be saved. For calculating the position of the rotor relative to the stator in the second operating state as well, the first functional region is designed such that it can activate the further functional regions required for this purpose and deactivate them again after the position value has been calculated and stored. In this way, the full functionality of the processing device is made available at low energy consumption. Depending on the design of the measuring device, the first functional region may be just a timing element or it may comprise a functionality for the provision of electric supply energy to the sensor system. In the first embodiment of the measuring device, the measuring device is switched off almost completely in the second operating state; only a timing element or timer is permanently in operation and after a presettable time interval delivers a wake-up signal to the second functional region and any further functional regions if provided. In response to this wake-up signal, the second functional region then provides the sensor system with supply energy and evaluates and stores the sensor signals which are gained. In the second embodiment of the measuring device, the supply energy for the sensor system is provided by the first functional region, and the sensor signals are processed and stored in the second functional region and any further functional regions if provided.

In a further development of the invention, it is provided that a motion sensor which detects a movement of the rotor relative to the stator while the voltage supply for the electric motor is disconnected and which causes a motion signal in the first functional region if a signal of the motion sensor, in particular an induced voltage, exceeds a presettable threshold value is assigned to the processing device, in particular to the first functional region of the processing device, so that the processing device, in particular the first functional region of the processing device, activates the second functional region and/or makes available supply energy to the sensor system. In this way, the motion sensor can initiate an additional position detection by the sensor system, which is performed in the time interval between the low-frequency intermittent provisions of supply energy for the sensor system. By means of this additional position detection, it is possible to avoid a position change caused by rapid movements of the rotor between regular position measurements; such a position change could result in an undesirable measuring error owing to the limited measuring range of the sensor system. The motion sensor is preferably designed as a current and/or voltage sensor and detects an electric voltage induced in a coil by a relative movement between the stator and the rotor.

The frequency for the low-frequency intermittent provision of supply energy for the sensor system in the second operating state and the threshold value for the motion signal are preferably matched to each other in such a way that a relative movement of the rotor with respect to the stator within a time interval between two measurements, which relative movement would result in exceeding a measuring range determined by the arrangement of the sensors of the sensor system, results in the outputting of the motion signal. In a brushless, electrically commutating DC motor, for example, three magnetic field sensors, in particular Hall sensors, are provided, by means of which the rotational position of the rotor relative to the stator can be detected. Depending on its construction, the rotor has, owing to the design and arrangement of permanent magnets, a magnetic field characteristic which is multiply equal with respect to its circumference. As a result, the measuring range of the sensors in which an unambiguous result can be provided for the rotational position of the rotor relative to the stator is an integral fraction of 360 degrees, in the present example 120 degrees. As the rotor rotates by 120 degrees, each of the sensors delivers the same signal pattern, so that there is, with respect to the whole revolution of the rotor, a triple multivaluedness of the signal pattern, which prevents an exact, absolute position determination. In the first operating state, this multivaluedness is avoided by providing the supply energy for the sensor system continuously or intermittently at a high frequency, thus ensuring a reliable monitoring of the rotor. In the second operating state, in which the supply energy is provided intermittently at a low frequency in order to save energy, a movement of the rotor which would exceed the measuring range of the sensors and lead to an ambiguous result has to be avoided. Such problems are prevented by providing that a movement of the rotor is detected by means of the motion sensor. As soon as a threshold value for the motion signal output by the motion sensor is exceeded, the sensor system is provided with supply energy prematurely or additionally, so that the position of the rotor can be detected as desired before the rotor leaves the respective measuring range of the sensors. In accordance with this, the first functional region also activates the second functional region of the processing device for processing and storing the signals of the sensor system.

BRIEF DESCRIPTION OF THE DRAWING

An advantageous embodiment of the invention is shown in the drawing, of which:

FIG. 1 is a schematic block diagram of an electric motor with an associated measuring device.

DETAILED DESCRIPTION OF THE INVENTION

An electric motor 1 as shown in FIG. 1 for converting electric power into mechanical power comprises a drive 2, which in the illustrated example is designed as a brushless, electrically commutated DC motor, and a control unit 3 designed for the control of the drive 2.

The drive 2 comprises a runner or rotor 4 mounted on a stator 5 for relative movement, in the present example for rotary movement. In the illustrated example, the rotor 4 is provided with a plurality of permanent magnets 6 in the shape of annular segments. The stator 4 comprises a plurality of coils 7 arranged in a cylindrical surface 8. Magnetic field sensors 9, in particular Hall sensors, which are mounted on the stator 5 and used for detecting the rotational position of the rotor 4 relative to the stator 5, are assigned to the rotor 4.

Via supply lines 10, 11, 12, the coils 7 are electrically connected to a power module 15 designed for the selective supply of electric power to the coils 7. The power module 15 is connected to a control module 17 via a control line 16. Via the control line 16, the control module 17 provides control commands for the power module 15 in order to control, in particular in a closed loop, the provision of electric power for the coils 7. The necessary information for the generation of the control commands is provided to the control module 17 via a data line 19 from a measuring module 18 or from a second processor system not shown in the drawing.

The measuring module 18 comprises a microprocessor 20 configured as a processing device, which is preferably designed as a power-saving microprocessor. In the illustrated example, the measuring module 18 further comprises a motion sensor 21, a capacitor arrangement 26 and a charging circuit 22 for the capacitor arrangement 26.

Functionally, the microprocessor 20 is divided into a first functional region 23 and a second functional region 24, which in the illustrated example are located on a common integrated circuit, in particular in a common semiconductor component.

In a first of the two embodiments of the microprocessor 20 shown in FIG. 1, the first functional region 23 is symbolically drawn in the microprocessor 20 with a square boundary, while the remaining region of the microprocessor forms the second functional region. The first functional region 23 is designed to provide an activation signal and a deactivation signal for the second, disconnectable, functional region 24. For this purpose, the first functional region 23 comprises a timing element not shown in detail, in which can be generated and output an activation signal for the second functional region 24 on the expiry of a first presettable period of time and a deactivation signal for the second functional region 24 on the expiry of a second presettable period of time.

In addition, the first functional region 23 is electrically connected to a motion sensor 21 designed for the determination of at least one voltage induced in the associated coils 7. The motion sensor 21 is preferably designed as a high-impedance voltage detector for an at least nearly loss-free detection of induced voltages in the coils 7. The motion sensor 21 is electrically coupled to the coils 7 via sensor lines 25. When a motion signal arrives from the motion sensor 21, the first functional region 23 can also output an activation signal to the second functional region 24.

In this first embodiment of the microprocessor 20, the second functional region 24 is configured for the provision of the supply energy to the magnetic field sensors 9. For this purpose, the second functional region 24 comprises a switching means 28, which is looped into a supply line 29 for optionally making or breaking a conductive connection between a supply voltage Uc which can be applied to the magnetic field sensors 9 and a chassis earth, thus ensuring the provision of electric energy for the magnetic field sensors 9 as required. In addition, the signals of the magnetic field sensors 9 are processed in the second functional region 24, and a position signal derived from these signals is provided for transmission to the control module 17.

In a second embodiment of the microprocessor 20, which is likewise shown in FIG. 1, the first functional region 23 is separated from the second functional region 24 by a zigzag line. In this second embodiment, the first functional region 23 is designed for the provision of supply energy for the magnetic field sensors 9. For this purpose, in contrast to the first embodiment, the switching means is assigned to the first functional region 23, enabling it to make or brake a conductive connection between a supply energy which can be applied to the magnetic field sensors 9 and a chassis earth, thereby influencing the provision of electric energy for the magnetic field sensors 9 as required.

In addition, the first functional region 23 of the second embodiment of the microprocessor 20 is electrically connected to the motion sensor 21 responsible for the determination of at least one voltage induced in the associated coils.

In addition, the first functional region 23 of the second embodiment of the microprocessor 20 is in the illustrated example designed for processing the signal provided by the motion sensor 21, which signal is compared to a presettable threshold value stored in the first functional region 23 and triggers the provision of a motion signal if the threshold value is exceeded. The processing and storage of the signals provided by the magnetic field sensors 9 to the first functional region 23 is provided for in the second functional region 24 of the microprocessor 20.

In the second embodiment of the microprocessor 20, the second functional region 24 can be electrically activated and deactivated by the first functional region 23 and is, by way of processing the signals of the magnetic field sensors 9, moreover designed for the provision of a position signal determined by means of these signals to the control module 17.

The electric motor 1 can be operated in at least two different operating states. In the first operating state, the electric motor 1 is supplied with an external supply voltage which is fed in, for example as mains voltage, at a supply voltage connection 30, in the present example into the power module 15, from where it is distributed to the other components of the control unit 3 via lines which are not shown in detail. With this external supply voltage, electric power can be provided for the coils 7 via the power module 15, which is controlled by the control module 17 in dependence on signals of the magnetic field sensors 9 which are evaluated by the measuring module 18, in order to effect a rotation of the rotor 4. In the first operating state, supply energy is fed to the magnetic field sensors 9 either continuously or intermittently with a high frequency in order to ensure that the relative movement between the rotor 4 and the stator 5 is monitored comprehensively. In this state, both the first functional region 23 and the second functional region 24 of the microprocessor 20 are activated, so that the control module 17 is permanently supplied with position data via the data line 19 and is therefore able to control the power module 15 accordingly. This applies to both embodiments of the microprocessor 20 shown in FIG. 1. The provision of electric power via the supply lines 10, 11 and 12 permits in the first operating state the charging of the capacitor arrangement 26 as well, because this is connected to the supply lines 10, 11 and 12 via the loading circuit 22 and can therefore use a fraction of the electric power provided for the coils 7 for charging the capacitor arrangement 26.

In a second operating state, in which no external supply voltage is applied to the electric motor 1, those components of the control unit 3 which are connected to the capacitor arrangement 26 are supplied with electric power. These components are diagrammatically provided with voltage inputs 31 connected to a voltage output 32 on the capacitor arrangement 26. The internal supply voltage provided at the voltage output 32 and applied to the voltage inputs 31 is referred to as capacitor voltage Uc.

In the illustrated example, the first functional region 23 of the microprocessor 20 is supplied with the capacitor voltage Uc. In the first embodiment of the microprocessor 20 as shown in FIG. 1, the activation of the second functional region 24, the provision of supply energy for the magnetic field sensors 9 and an evaluation of the sensor signals in the second functional region 24 occur within a presettable time grid which is monitored by the first functional region 23. In addition, a signal of the motion sensor 21 also results in the activation of the second functional region 24 with the aid of the first functional region 23.

In the second embodiment of the microprocessor 20 as shown in FIG. 1, the motion sensor 21 is monitored continuously in the first functional region 23. For this purpose, an electric voltage induced in the associated coil 7 by a relative movement between the rotor 4 and the stator 5 is detected in the first functional region 23 and compared to a presettable threshold value. In addition, the first functional region 23 supplies supply energy to the magnetic field sensors 9 at presettable time intervals, in particular with a constant frequency. For this purpose, the first functional region 23 closes the switching means 28, enabling the magnetic field sensors 9 to scan the position of the rotor 4 with respect to the stator 5. The signals of the magnetic field sensors 9 are transmitted by the first functional region 23 to the second functional region 24, which is for this purpose temporarily switched from a deactivated state to an activated state by the first functional region 23. In the second functional region 24, the signals of the magnetic field sensors 9 are evaluated, and a position signal is calculated and stored. Following the evaluation of the signals, the second functional region 24 is once again deactivated. The first functional region 23 then determines, for example with the aid of an integrated timing element, the next point in time when the magnetic field sensors 9 are once again to be supplied with supply energy. The timing element is preferably set to a presettable frequency.

In the illustrated example, an additional, for example incremental or single-turn, absolute rotary encoder 33 is assigned to the drive 2. This is designed for a more precise detection of the position of the rotor 4 relative to the stator 5 in the first operating state. A signal generated by the rotary encoder 33, which is non-rotatably coupled to the rotor 4 of the drive 2 as shown diagrammatically, is transmitted to the control module 17 via a signal line 34.

What is claimed is:

1. An electric motor having a rotor and a stator as well as a measuring device designed for detecting a position of the rotor, which is movable relative to the stator, and comprising a sensor system for the provision of sensor signals in dependence on the position of the rotor relative to the stator and a processing device for controlling the sensor system, for processing the sensor signals and for outputting a position signal, wherein the processing device is configured for switching between a first operating state with a continuous or high-frequency intermittent provision of supply energy to the sensor system and a second operating state with a low-frequency intermittent provision of supply energy to the sensor system,
   wherein the processing device comprises a first circuit block and a second circuit block, the first circuit block being configured to switch the second circuit block between an activation state and a deactivation state, and
   wherein the sensor system comprises a motion sensor configured to provide a signal if the rotor moves relative to the stator while the voltage supply for the electric motor is disconnected, and
   wherein the first circuit block of the processing device is configured to evaluate the signal provided by the motion sensor and to output a motion signal to the second circuit block when the signal provided by the motion sensor exceeds a presettable threshold value, the motion signal switching the second circuit block from the deactivation state to the activation state, the second circuit block providing the sensor system with supply energy when switched to the activation state.

2. An electric motor according to claim 1, wherein a capacitor arrangement designed for the provision of the supply energy to the processing device while the supply voltage for the electric motor is disconnected is assigned to the processing device.

3. An electric motor according to claim 2, wherein the capacitor arrangement is electrically coupled to a coil winding of the stator and/or the rotor in such a way that in the second operating state, in which the electric motor is disconnected from the voltage supply, an electric voltage induced in the rotor and/or the stator can be made available as charging voltage for the capacitor arrangement.

4. An electric motor according to claim 3, wherein the induced voltage is an intermediate circuit voltage being used for charging the capacitor arrangement.

5. An electric motor according to claim 1, wherein the processing device is designed for a provision of supply energy to the sensor system if the motion signal is present.

6. An electric motor according to claim 1, wherein the motion sensor is designed as a current and/or voltage sensor for a detection of an electric potential in a coil winding of the stator and/or of the rotor, in order to detect, at a relative movement between the stator and the rotor, an electric voltage induced in the rotor and/or in the stator and to output the motion signal if the induced voltage exceeds a presettable threshold value.

7. An electric motor according to claim 1, wherein the measuring device comprises a measuring transducer which is designed to scan a position of the rotor and is coupled to the rotor and which is provided for making available a position signal in the first operating state.

8. A method for monitoring an electric motor comprising a stator and a rotor movable relative thereto as well as a measuring device which is designed for the determination of a position of the rotor mounted for relative movement with respect to the stator and which comprises a sensor system for the provision of sensor signals in dependence on the position of the rotor relative to the stator and which further comprises a processing device for controlling the sensor system, for processing the sensor signals and for outputting a position signal, the method comprising the steps of:
   providing a continuous or high-frequency intermittent supply energy for the sensor system by the processing device in a first operating state;
   providing a low-frequency intermittent supply energy for the sensor system in a second operating state;
   evaluating the sensor signal by the processing device; and
   outputting and/or storage of a position signal describing the position of the rotor relative to the stator,
   wherein the processing device comprises a first circuit block and a second circuit block, the first circuit block taking over the low-frequency intermittent provision of supply energy for the sensor system and switching the second circuit block between a deactivation state and an activation state for the evaluation of the sensor signal and/or for the storage of the position signal in the second operating state, and
   wherein the sensor system comprises a motion sensor for detecting a movement of the rotor relative to the stator while the voltage supply for the electric motor is disconnected and for generating a motion signal in the first circuit block if an induced voltage of the motion sensor exceeds a presettable threshold value, the motion signal switching the second circuit block from the deactivation state to the activation state, wherein the second circuit block makes supply energy available to the sensor system when switched to the activation state.

9. A method according to claim 8, wherein the supply energy for the processing device is provided by a capacitor arrangement while a voltage supply for the electric motor is disconnected.

10. A method according to claim 9, wherein the capacitor arrangement is charged by means of an electric voltage induced in the rotor and/or in the stator during a second operating stage in which the electric motor is disconnected from an external supply, wherein an electric coupling of the capacitor arrangement to a coil winding of the stator and/or of the rotor is provided.

11. A method according to claim 8, wherein the frequency for the low-frequency intermittent provision of supply energy for the sensor system in the second operating state and the threshold value for the motion signal are matched to each other in such a way that a relative movement of the rotor with respect to the stator within a time interval between two measurements, which relative movement would result in exceeding a measuring range determined by the arrangement of the sensors of the sensor system, results in the outputting of the motion signal.

\* \* \* \* \*